(12) United States Patent
Guo et al.

(10) Patent No.: US 8,797,664 B1
(45) Date of Patent: Aug. 5, 2014

(54) POLARITY DETECTION OF PIEZOELECTRIC ACTUATOR IN DISK DRIVE

(71) Applicant: Western Digital Technologies, Inc., Irvine, CA (US)

(72) Inventors: Hengchang Guo, Rancho Santa Margarita, CA (US); Duc T. Phan, Saratoga, CA (US); Yanan Huang, Torrance, CA (US); Chuanwen Ji, Irvine, CA (US); Yakov M. Lifschitz, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/726,007

(22) Filed: Dec. 22, 2012

(51) Int. Cl.
*G11B 27/36* (2006.01)

(52) U.S. Cl.
USPC .................. 360/31; 360/39; 360/55; 360/69; 360/75

(58) Field of Classification Search
None
See application file for complete search history.

(56) References Cited

U.S. PATENT DOCUMENTS

| | | | |
|---|---|---|---|
| 2,728,222 A | 12/1955 | Becker et al. | |
| 4,760,358 A | 7/1988 | Inoue | |
| 5,118,982 A | 6/1992 | Inoue et al. | |
| 5,262,643 A | 11/1993 | Hammond et al. | |
| 5,301,558 A | 4/1994 | Livingston et al. | |
| RE37,030 E | 1/2001 | Lloyd et al. | |
| 6,249,890 B1 | 6/2001 | Ukani et al. | |
| 6,510,752 B1 | 1/2003 | Sacks et al. | |
| 6,556,028 B1 | 4/2003 | Umanskiy et al. | |
| 6,556,933 B1 | 4/2003 | Sacks et al. | |
| 6,639,411 B1 | 10/2003 | Thomsen | |
| 6,831,807 B2 | 12/2004 | Koso et al. | |
| 6,861,854 B1 | 3/2005 | Guo et al. | |
| 6,870,377 B2 | 3/2005 | Thomsen | |
| 6,895,547 B2 | 5/2005 | Eleftheriou et al. | |
| 6,975,477 B1 | 12/2005 | Hu et al. | |
| 6,977,793 B2 | 12/2005 | White et al. | |
| 7,009,804 B2 | 3/2006 | Sharma et al. | |
| 7,062,698 B2 | 6/2006 | Yang | |
| 7,072,134 B1 | 7/2006 | Hirano et al. | |
| 7,072,417 B1 | 7/2006 | Burd et al. | |
| 7,075,748 B2 | 7/2006 | White et al. | |
| 7,079,338 B1 | 7/2006 | Semba et al. | |
| 7,079,339 B1 | 7/2006 | Semba et al. | |
| 7,106,552 B2 | 9/2006 | Hirano et al. | |

(Continued)

FOREIGN PATENT DOCUMENTS

| | | |
|---|---|---|
| UA | 20940 | 2/2007 |
| UA | 20943 | 2/2007 |
| WO | WO2009128546 | 10/2009 |

OTHER PUBLICATIONS

Bernhard M.J. Leiner, "LDPC Codes—a brief Tutorial", Stud. ID: 53418L, Apr. 8, 2005, pp. 1-9.

*Primary Examiner* — Muhammad N Edun (57) ABSTRACT

Determining a polarity of a piezoelectric (PZT) actuator of a disk drive including a disk for storing data and a head for reading and writing data. A test signal is injected into the PZT actuator and a position signal is received which indicates a position of the head over the disk resulting from the test signal. A test compensation signal is generated based on the received position signal and the polarity of the PZT actuator is determined based on a phase of the generated test compensation signal.

20 Claims, 7 Drawing Sheets

(56) References Cited

U.S. PATENT DOCUMENTS

| | | | |
|---|---|---|---|
| 7,124,654 B1 | 10/2006 | Davies et al. | |
| 7,184,230 B1 | 2/2007 | Chue et al. | |
| 7,336,434 B2 | 2/2008 | Lille et al. | |
| 7,346,832 B2 | 3/2008 | Richardson et al. | |
| 7,395,490 B2 | 7/2008 | Richardson et al. | |
| 7,423,837 B2 | 9/2008 | Hutsell | |
| 7,657,816 B2 | 2/2010 | Cohen et al. | |
| 7,768,276 B2 | 8/2010 | Yao | |
| 7,814,393 B2 | 10/2010 | Kyung et al. | |
| 7,913,149 B2 | 3/2011 | Gribok et al. | |
| 7,940,490 B2 * | 5/2011 | Shelor | 360/78.05 |
| 8,322,235 B1 | 12/2012 | Keopuang et al. | |
| 8,335,049 B1 | 12/2012 | Liu et al. | |
| 8,531,792 B1 * | 9/2013 | Burd et al. | 360/51 |
| 8,547,657 B1 | 10/2013 | Liu et al. | |
| 8,605,383 B1 | 12/2013 | Wang et al. | |
| 2001/0030822 A1 * | 10/2001 | Boutaghou et al. | 360/25 |
| 2003/0037298 A1 | 2/2003 | Eleftheriou et al. | |
| 2003/0065992 A1 | 4/2003 | Yang | |
| 2003/0076121 A1 | 4/2003 | Guo et al. | |
| 2004/0098659 A1 | 5/2004 | Bjerke et al. | |
| 2005/0204253 A1 | 9/2005 | Sukhobok et al. | |
| 2005/0216821 A1 | 9/2005 | Harada | |
| 2005/0246617 A1 | 11/2005 | Kyung et al. | |
| 2006/0036925 A1 | 2/2006 | Kyung et al. | |
| 2006/0036933 A1 | 2/2006 | Blankenship et al. | |
| 2006/0171062 A1 | 8/2006 | Hirano et al. | |
| 2008/0165444 A1 | 7/2008 | Zafer | |
| 2009/0249159 A1 | 10/2009 | Lee et al. | |
| 2009/0303839 A1 | 12/2009 | Narayanan et al. | |
| 2010/0037674 A1 | 2/2010 | Yashchuk et al. | |
| 2010/0100788 A1 | 4/2010 | Yang et al. | |
| 2011/0299197 A1 | 12/2011 | Eguchi | |

* cited by examiner

POLARITY DETECTION OF PIEZOELECTRIC ACTUATOR IN DISK DRIVE

BACKGROUND

Disk drives are often used to write data on or to read data from a recording media. A disk drive can include multiple rotating magnetic disks with tracks for storing data and heads to read data from the disks and/or to write data on the disks. The disks are typically arranged in a stacked configuration with the heads arranged in a corresponding stacked assembly referred to as a head stack assembly (HSA). The HSA can be attached to an actuator arm that is typically moved by a voice coil motor (VCM). This arrangement ordinarily allows for positioning of the head to read data from or to write data on an adjacent surface of one of the disks in the stack.

In order to increase the amount of data that can be stored in a given area on the disks, the disk drive industry has been increasing the number of tracks per inch (TPI) on the disks. However, an increased TPI requires more accurate and reliable positioning of the heads over the disks. One approach to improve head positioning is to use a dual stage actuator (DSA). In DSA drives, micro piezoelectric (PZT) actuators can provide a finer actuation for each head in addition to the actuation typically provided by the VCM. Each head in the HSA usually has its own PZT actuator to provide a finer actuation for the head.

In many DSA drives, each PZT actuator includes two PZT elements with a first PZT element of a first polarity adjacent a second PZT element of an opposite polarity. By applying a control voltage across the oppositely polarized PZT elements, it is ordinarily possible to cause one PZT element to contract and the other PZT element to expand, thereby causing movement of the head in a direction perpendicular to the actuator arm.

Typically, the PZT actuators can be arranged in either an in-phase or out-of-phase polarity configuration. In the in-phase configuration, the PZT actuators for each of the heads in the head stack are arranged so that the PZT elements of each PZT actuator have the same polarity on one side of the actuator arm. In this configuration, all the heads in the HSA should move in the same direction when applying the same control voltage.

In the out-of-phase configuration, the PZT actuators are arranged so that the PZT elements of every other PZT actuator have the same polarity on one side of the actuator arm. In this configuration, adjacent heads in the head stack should move in opposite directions when applying the same control voltage. Since each of the in-phase and out-of-phase configurations offers different performance and manufacturing benefits, DSA drives may come in either configuration.

Accordingly, a PZT polarity is usually selected during a setup process for controlling the position of a head based on either an in-phase polarity configuration or an out-of-phase polarity configuration. If the wrong polarity has been selected for a PZT actuator, the head can move in the wrong direction and create head positioning problems during operation of the disk drive.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
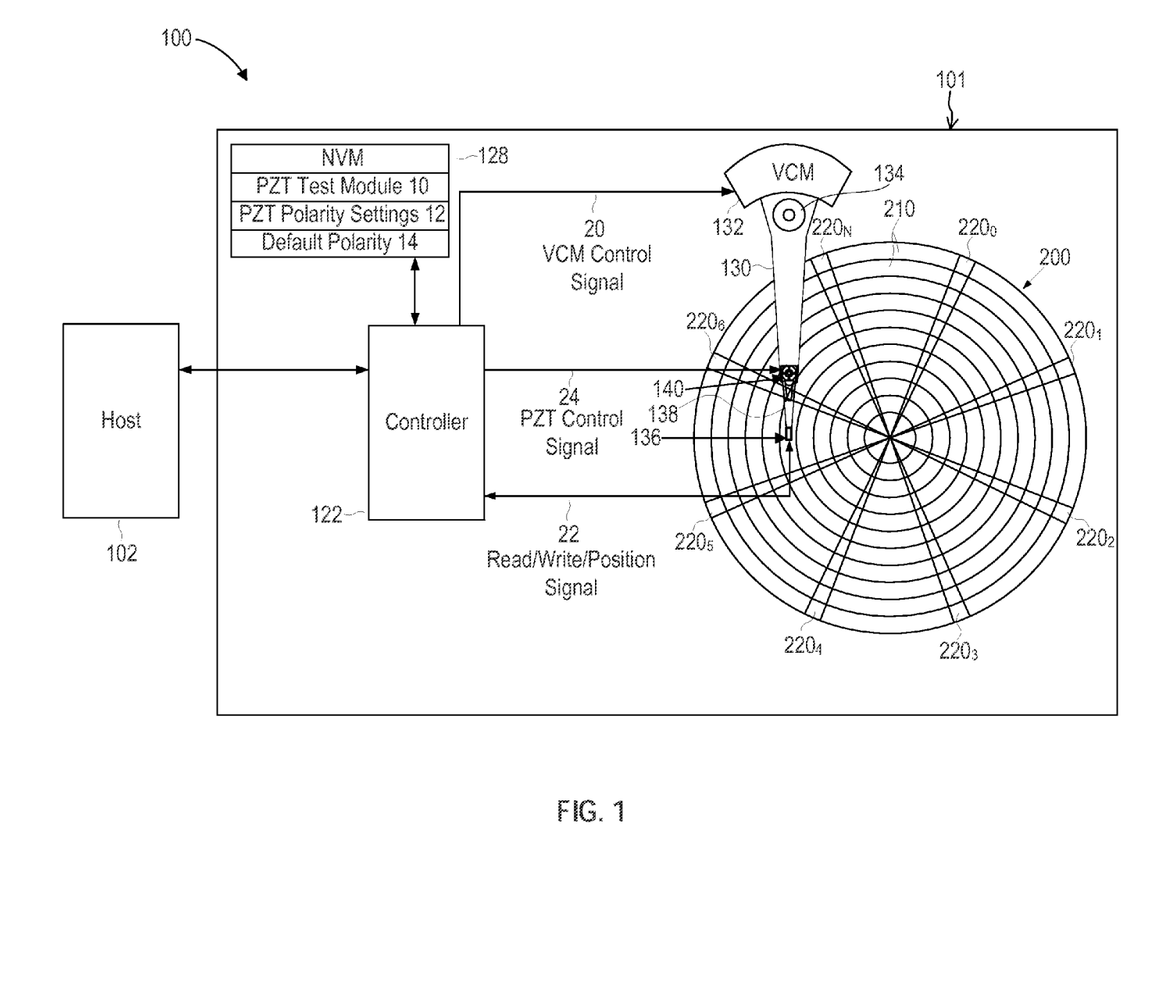
FIG. 1 is a block diagram depicting a disk drive according to an embodiment.

FIG. 1 shows disk drive 101 and host 102, which together form computer system 100, which can be, for example, a personal computer, a data storage system, or other electronic device. As shown in FIG. 1, disk drive 101 includes controller 122 which can perform various operations of disk drive 101 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 1, disk drive 101 includes rotating magnetic disk 200 and head 136 connected to the distal end of actuator arm 130 which is rotated about pivot 134 by voice coil motor (VCM) 132 to position head 136 over disk 200. Head 136 includes at least a read portion (not shown) for reading data from disk 200 and a write portion (not shown) for writing data on disk 200. In addition to VCM 132, disk drive 101 includes PZT actuator connected to suspension assembly 138 to provide fine positioning of head 136 over disk 200.

Disk 200 comprises a number of radial spaced, concentric tracks 210 for storing data. In addition, disk 200 includes a plurality of angularly spaced servo wedges $220_0$-$220_N$, each of which may include embedded servo information that can be read from disk 200 by head 136 to determine the position of head 136 over disk 200. For example, each servo wedge $220_0$-$220_N$ may include a pattern of alternating magnetic transitions (servo burst), which may be read from disk 200 by head 136 and transmitted as position signal 22 for processing by controller 122 to measure the position of head 136 over disk 200. The angular spacing between servo wedges $220_0$-$220_N$ may be uniform, as shown in the example of FIG. 1.

As discussed in more detail below with reference to FIGS. 5A and 5B, disk drive 101 can include multiple disks in a stacked configuration below disk 200. In addition, disk 200 can include multiple suspension assemblies below suspension assembly 138 as part of a head stack assembly (HSA). As discussed with reference to FIGS. 5A and 5B, each of the suspension assemblies in the HSA of disk drive 101 can include a head similar to head 136 and a PZT actuator similar to PZT actuator 140.

As shown in FIG. 1, disk drive 101 includes solid state non-volatile memory (NVM) 128 for storing data such as PZT test module 10, PZT polarity settings 12, and default polarity 14. PZT test module 10 can include instructions for execution by controller 122 for implementing the process shown in FIG. 7. In addition, controller 122 can use PZT polarity settings 12 and/or default polarity 14 in detecting a polarity of a PZT actuator of disk drive 101 as described below with reference to the example process of FIG. 7.

In other embodiments, NVM 128 can include additional components not shown in the example of FIG. 1. Such additional components can include, for example, firmware or other data for controlling disk drive 101 during operation. In other embodiments, NVM 128 may not include all of the components shown in FIG. 1. For example, PZT polarity selections 12 and/or default polarity 14 may not be used in detecting polarities of PZT actuators or may be combined with PZT test module 10.

While the description herein refers to NVM generally, it is understood that NVM may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In operation, controller 122 writes data on and reads data from disk 200 in response to commands from host 102. To write data to disk 200, controller 122 positions head 136 over disk 200 by sending VCM control signal 20 (e.g., control current) to VCM 132. As discussed in more detail with reference to FIGS. 2 to 4 below, controller 122 also sends PZT control signal 24 (e.g., control voltage) to PZT actuator 140 to position head 136 over disk 200. Controller 122 adjusts PZT control signal 24 and VCM control signal 20 as needed based on position signal 22 read from disk 200.

Controller 122 processes data to be written to disk 200 into write signal 22, which is output to head 136. For its part, head 136 converts write signal 22 into a magnetic field that magnetizes the surface of disk 200 based upon write signal 22, thereby magnetically writing data on disk 200. Controller 122 may notify host 102 after data for the write command has been successfully written on disk 200.

When controller 122 receives a read command from host 102 requesting data written on disk 200, controller 122 positions head 136 over disk 200 by sending VCM control signal 20 to VCM 132 and sending PZT control signal 24 to PZT actuator 140. Head 136 then generates read signal 22 based upon the magnetization of the disk surface under head 136 and controller 122 processes read signal 22 into data.

Figure 2:
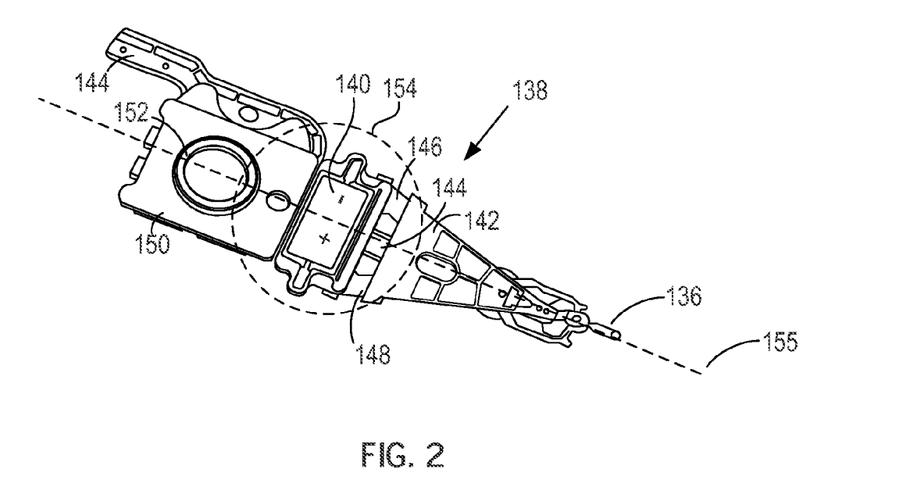
FIG. 2 illustrates a suspension assembly of the disk drive of FIG. 1 according to an embodiment.

FIG. 2 illustrates a top view of an example arrangement for suspension assembly 138 including PZT actuator 140. As shown in FIG. 2, suspension assembly 138 includes load beam 142 and laminated flexure 144 attached to load beam 142. Laminated flexure 144 provides electrical paths to and from head 136 to facilitate signal transmission. Load beam 142 is attached to mounting plate 150 via hinge plates 146 and 148. These components may, for example, be made of stainless steel and their attachments to each other may be made by spot welding. Alternatively, load beam 142 may have integral hinge plate regions rather than being assembled with separate hinge plates so that load beam 142 and its hinge plate regions would be a single component. Mounting plate 150 can include swage boss 152 to facilitate attachment of suspension assembly 138 to actuator arm 130.

Figure 3:
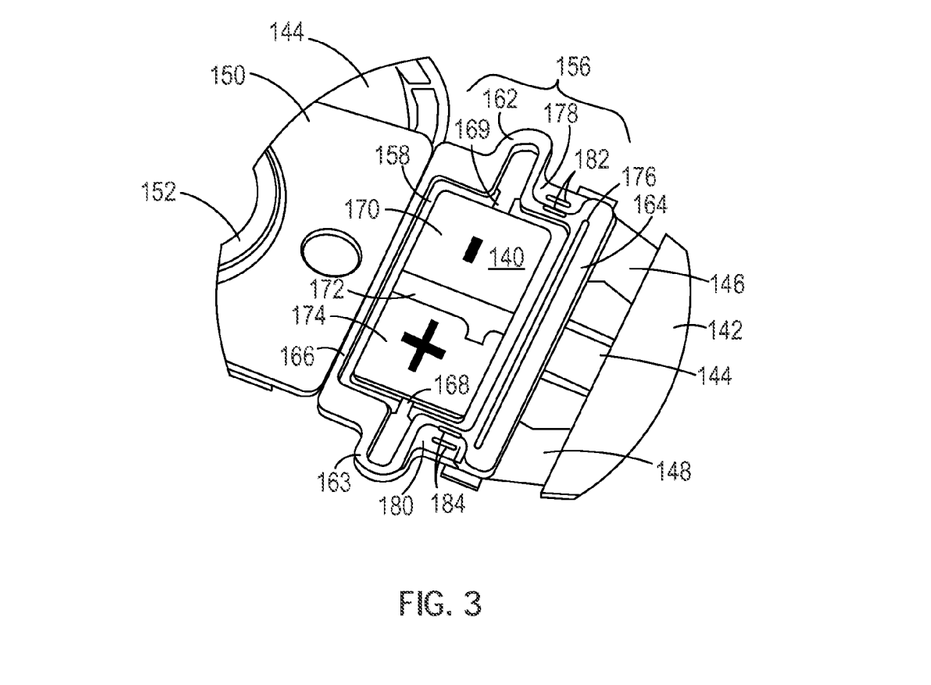
FIG. 3 provides a closer view of the suspension assembly shown in FIG. 2.

FIG. 3 is an expanded view of the region of suspension assembly 138 labeled 154 in FIG. 2. As shown in FIG. 3, PZT mounting structure 156 extends from mounting plate 150 and includes partially etched well 158 into which PZT actuator 140 is placed. PZT actuator 140 may be adhered to PZT mounting structure 156 by an adhesive (e.g., UV cured epoxy or thermal set epoxy), and such adhesive or another encapsulate material may be disposed around the periphery of PZT actuator 140 and within partially etched well 158 to help prevent particle shedding. This effectively mechanically couples PZT actuator 140 to PZT mounting structure 156.

As shown, PZT mounting structure 156 can include at least one compliant arm 162 so PZT actuator 140 can move distal portion 164 relative to anchored portion 166 of PZT mounting structure 156. For example, PZT mounting structure 156 may comprise two compliant arms 162 and 163 so that PZT mounting structure 156 encompasses windows 168 and 169 spanned by PZT actuator 140.

Load beam 142 extends from distal portion 164 of PZT mounting structure 156 with hinge plates 146 and 148 connecting distal portion 164 and load beam 142. Distal portion 164 may include adhesive-limiting trench 176 to help prevent adhesive from reaching and potentially undesirably affecting the structural characteristics of hinge plates 146 and 148. PZT mounting structure 156 may comprise a stainless steel surface having two regions 178 and 180 that may be coated with a conductive inert layer and configured as an electrical connection region. Regions 178 and 180 of the stainless steel surface of PZT mounting structure 156 may include partial etched trenches 182 and 184, respectively.

In the example of FIG. 3, PZT actuator 140 includes PZT elements 170 and 174, separated by isolation region 172. As indicated in FIG. 3, PZT element 170 is polarized negatively and PZT element 174 is polarized positively. In operation, this difference in polarity enables differential motion between PZT elements 170 and 174 when an electric field is applied to the oppositely polarized elements from a common bottom electrode (not shown) under PZT elements 170 and 174. In more detail, one PZT element will expand while the oppositely polarized PZT element will contract in response to the electric field. The resulting differential motion between PZT elements 170 and 174 causes movement of load beam 142 with respect to axis 155, which in turn, causes movement of head 136. The direction of motion of head 136 with respect to axis 155 depends upon the polarity of the electric field applied to the common bottom electrode (not shown) and the arrangement of the polarities of PZT elements 170 and 174.

In an alternative embodiment, PZT element 170 has the same polarity as PZT element 174. Such an arrangement enables differential motion with the application of oppositely polarized electric fields to PZT elements 170 and 174 from separate bottom electrodes (not shown). As will be understood by those of ordinary skill in the art, other arrangements for a PZT actuator are possible within the scope of the present disclosure.

Figure 4:
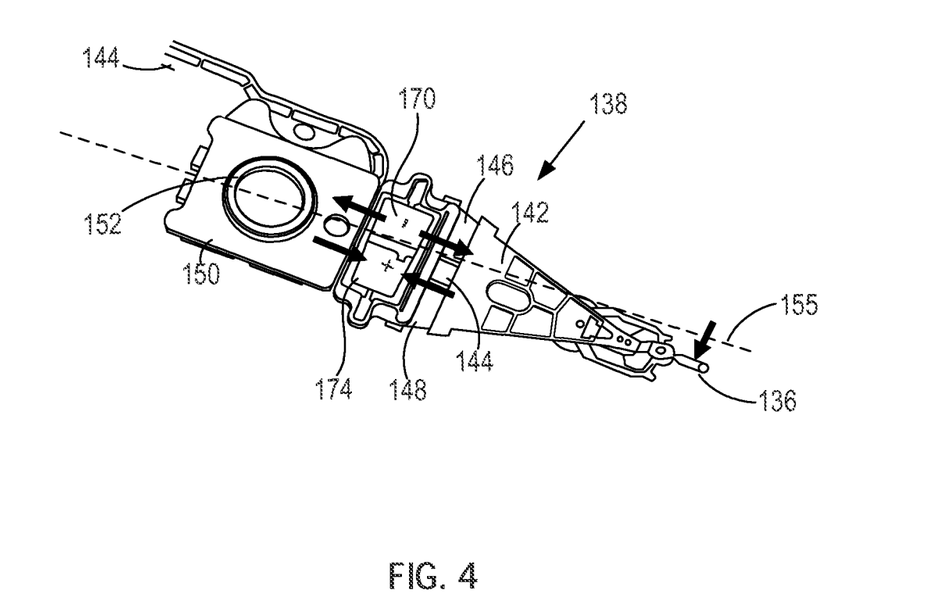
FIG. 4 illustrates actuation of a piezoelectric actuator of the suspension assembly shown in FIG. 2.

FIG. 4 illustrates movement of head 136 caused by PZT actuator 140. As shown by the arrows in FIG. 4, PZT element 170 expands while PZT element 174 contracts. This displacement of the PZT elements causes a rotating movement of distal portion 164 of PZT mounting structure 156 relative to anchor portion 166, thereby causing movement of load beam 142 and head 136 relative to axis 155. The direction of movement is determined by the polarity of the electric field applied to the PZT elements and the polarity of the PZT elements. In other words, if either the relative positions of the positive and negative PZT elements are reversed or the polarity of the electric field applied to the PZT elements is reversed, the motion of head 136 would be in the opposite direction from what is shown in FIG. 4. Accordingly, knowing the polarity of the PZT elements is important when controlling PZT actuator 140 to ensure that head 136 moves in the desired direction.

Figure 5A:
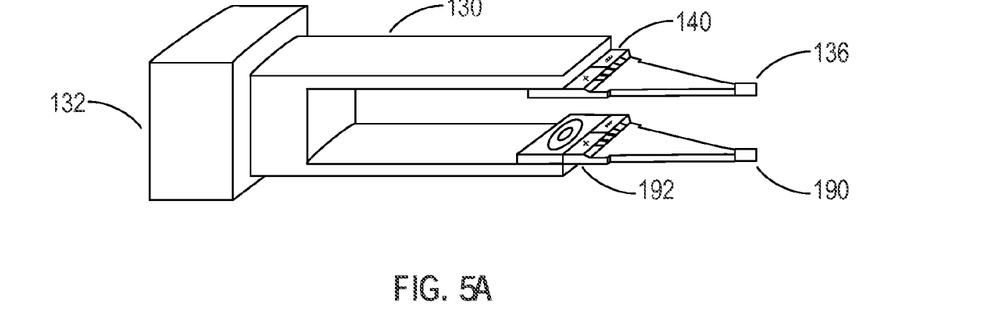
FIG. 5A illustrates an in-phase polarity configuration for adjacent piezoelectric actuators according to an embodiment.
Figure 5B:
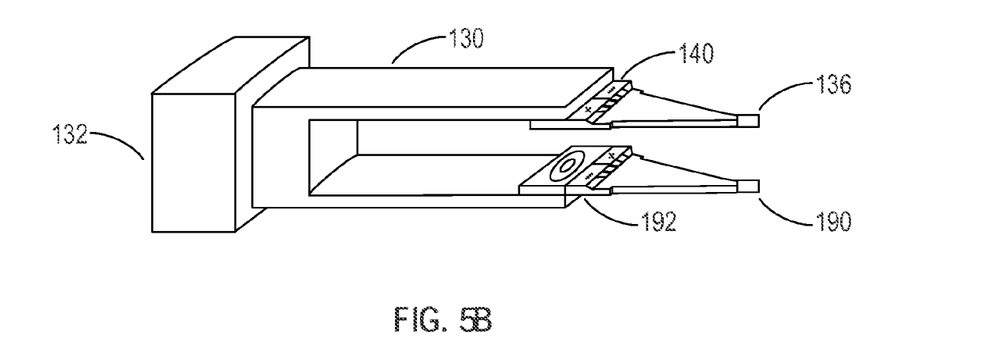
FIG. 5B illustrates an out-of-phase polarity configuration for adjacent piezoelectric actuators according to an embodiment.

FIGS. 5A and 5B illustrate two different polarity configurations for PZT actuators in an HSA of disk drive 101. In more detail, FIG. 5A illustrates an in-phase polarity configuration for adjacent PZT actuators 140 and 192 and FIG. 5B illustrates an out-of-phase polarity configuration for adjacent PZT actuators 140 and 192. Disk 200, which would ordinarily appear between heads 136 and 190 has been removed in FIGS. 5A and 5B to better show the polarities for PZT actuators 140 and 192. As appreciated by those of ordinary skill in the art, alternative embodiments of disk drive 101 can include multiple disks and additional suspension assemblies in the HSA.

As shown in FIG. 5A, the PZT elements for PZT actuators 140 and 192 have a positive polarity on one side of actuator arm 130 and a negative polarity on the opposite side of actuator arm 130. Thus, the same control voltage applied to PZT actuators 140 and 192 should cause heads 136 and 190 to move in the same direction.

FIG. 5B illustrates a polarity configuration where the PZT elements for adjacent PZT actuators 140 and 192 have opposite polarities on one side of actuator arm 130. Thus, the same control voltage applied to PZT actuators 140 and 192 should cause heads 136 and 190 to move in opposite directions. Both the in-phase and out-of-phase polarity configurations have different performance and manufacturing benefits. Thus, it is not uncommon for both configurations to be used in DSA drives. Since as discussed above, application of the wrong control voltage results in movement of the head in the opposite direction, often time-consuming testing must be performed during a manufacturing process to ensure the correct polarity has been set for each head. In this regard, the block diagram of FIG. 6 and process of FIG. 7 describe an embodiment that allows for efficient detection of polarity in the field and/or at the factory.

Figure 6:
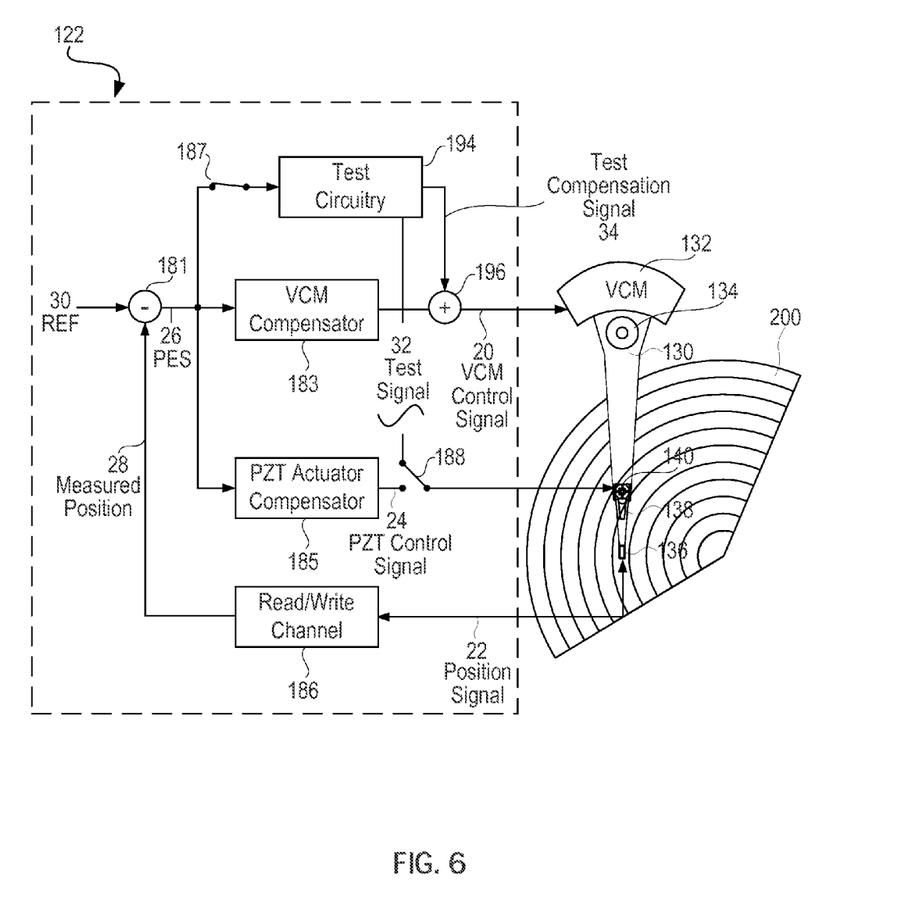
FIG. 6 is a block diagram depicting circuitry of a controller of the disk drive of FIG. 1 according to an embodiment.

FIG. 6 provides a block diagram depicting circuitry of controller 122 of disk drive 101 according to an embodiment. As shown in FIG. 6, controller 122 includes test circuitry 194, VCM compensator 183, PZT actuator compensator 185, and read/write channel 186.

During normal operation, position signal 22 can be read from head 136 based on servo bursts 220 (shown in FIG. 1). Position signal 22 is processed by read/write channel 186 of controller 122 into measured position 28 which is subtracted from reference position 30 at subtractor 181. The difference between reference position 30 and measured position 28 results in position error signal (PES) 26 which is input into VCM compensator 183 and PZT actuator compensator 185. For its part, VCM compensator 183 generates VCM control signal 20 to control VCM 132 to reduce the magnitude of PES 26, or in other words, to converge measured position 28 with reference position 30. In addition, PZT actuator compensator 185 generates PZT signal 24 to further facilitate convergence of measured position 28 with reference position 30. During normal operation, test circuitry 194 is not used and switches 187 and 188 are in the opposite position shown in FIG. 6 to disable test circuitry 194 and allow PZT actuator compensator 185 to control PZT actuator 140.

During an example polarity detection described below with reference to FIG. 7, PZT actuator compensator 185 is disabled by opening or conceptually opening switch 188 to the position shown in FIG. 6 and test circuitry 194 is connected to PZT actuator 140 so that test circuitry 194 can inject test signal 32 into PZT actuator 140. Switch 188 can be conceptual in the sense that the PZT control loop may be disabled using any suitable technique, such as by setting the output of PZT Actuator Compensator 185 to zero.

In addition, test circuitry 194 is enabled during the polarity detection by closing or conceptually closing switch 187 so test circuitry 194 can accept PES 26 and output test compensation signal 34, which is added to VCM control signal 20 at adder 196. In another embodiment, test compensation signal 34 is added to PES 26 for input into VCM compensator 183 instead of being added after VCM compensator as shown in FIG. 6. In yet another embodiment, test compensation signal 34 is used as a pure measurement signal, and not added to anywhere in FIG. 6. In each of these cases, and as described with reference to FIG. 7 below, the phase of test compensation signal 34 can be used to detect a polarity for PZT actuator 140.

Figure 7:
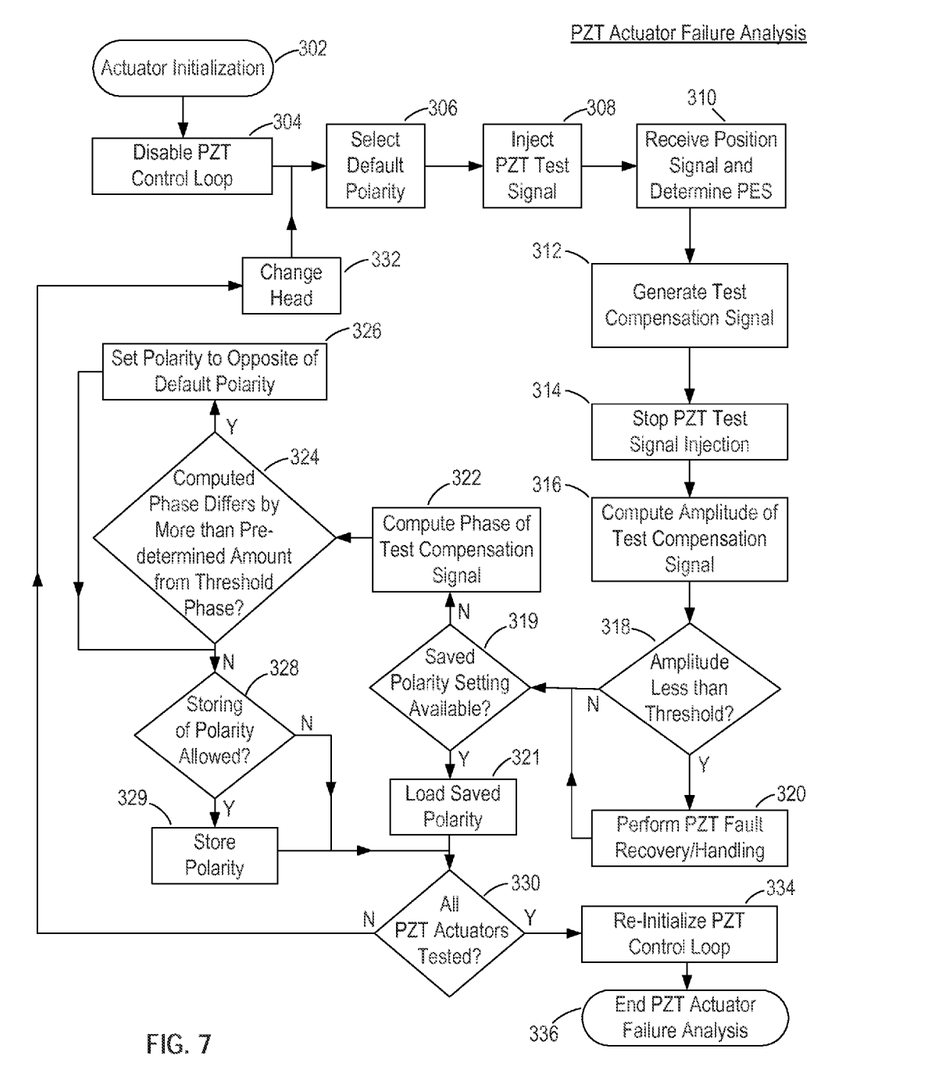
FIG. 7 is a flowchart for a piezoelectric actuator failure analysis process including PZT actuator polarity detection according to an embodiment.

FIG. 7 is a flowchart for a PZT actuator failure analysis including PZT actuator polarity detection in accordance with one embodiment which can be implemented by execution of PZT module 10 by controller 122. Although polarity detection is shown as part of a larger polarity failure analysis process in FIG. 7, those of ordinary skill in the art will understand that the polarity detection can be implemented as its own process separate from a PZT failure analysis. In addition, the process of FIG. 7 can be performed as part of a manufacturing process of disk drive 101 and/or each time disk drive 101 is powered up. The process of FIG. 7 may also be performed each time after a certain number of power-ups of disk drive 101.

The PZT actuator failure analysis of FIG. 7 begins in block 302 with initialization of PZT actuator 140. Controller 122 disables the PZT control loop in block 304 as indicated by the positions of switches 187 and 188 shown in FIG. 6. In block 306, controller 122 selects a default polarity for PZT actuator 140. Selecting a default polarity can include retrieving default polarity 14 from NVM 128 for PZT actuator 140. The default polarity can be a presumed polarity configuration for the PZT elements for PZT actuator 140. For example, the default polarity can be a binary number indicating a negative polarity for PZT element 170 and a positive polarity for PZT element 174. In some embodiments, the default polarity may be included as part of PZT test module 10 stored in NVM 128 without separately storing default polarity 14.

In block 308, test circuitry 194 of controller 122 injects test signal 32 into PZT actuator 140. In response, PZT actuator 140 ordinarily moves head 136 in response to test signal 32.

In block 310, read/write channel 186 of controller 122 receives position signal 22 from head 136 based on servo bursts 220 read from disk 200, thereby indicating any displacement of head 136 in response to test signal 32. Read/write channel 186 processes the received position signal 22 into measured position 28, which is subtracted from reference position 30 to determine PES 26.

From PES 26, test circuitry 194 generates test compensation signal 34 in block 312. In one embodiment, the generated test compensation signal 34 includes adaptive feed-forward coefficients (AFC) A and B. In such an example, test compensation signal 34 can be expressed as I=A cos ωt+B sin ωt, where I is a current of test compensation signal 34, A and B are AFC coefficients, and ω is the frequency of PZT test signal 32.

In block 314, test circuitry 194 stops injecting PZT test signal 32 into PZT actuator 140 and computes the amplitude of test compensation signal 34 in block 316. For example, with reference to the equation for test compensation signal 34 provided above, test circuitry 194 may compute the amplitude of test compensation signal 34 as $\sqrt{A^2+B^2}$.

In block 318, test circuitry 194 determines whether the computed amplitude is less than a threshold value. This determination is performed to check that PZT actuator 140 in fact moved head 136 in response to test signal 32. If the amplitude is less than the threshold value, this can indicate that PZT actuator 140 did not sufficiently move head 136 in response to test signal 32 and that PZT actuator 140 may therefore be defective. Accordingly, if it is determined in block 318 that the amplitude is less than the threshold, controller 122 performs PZT fault recovery or handling in block 320. Such PZT fault recovery or handling can include, for example, disabling head 136 from future use or further testing of PZT actuator 140.

If the amplitude is determined to be greater than or equal to the threshold, then in block 319, controller 122 checks whether there is a polarity setting associated with head 136 in PZT polarity settings 12, which is stored in NVM 128. The polarity of the PZT actuators can be saved in PZT polarity settings 12 during a manufacturing process.

As discussed above, the PZT actuator failure analysis of FIG. 7 may be performed during an initial start-up in a manufacturing process or may be performed during start-up of disk drive 101 in the field. Although polarity settings can be saved during the manufacturing process, it is possible that such settings may not be available after disk drive 101 has left the factory, for example, due to corruption of PZT polarity settings 12.

If it is determined in block 319 that a saved polarity setting is available for head 136, controller 122 loads the saved polarity setting associated with head 136 in block 321 and the process proceeds to block 330 to determine whether the PZT actuators for all of the heads in disk drive 101 have been tested.

If controller 122 determines that no saved polarity setting is available in block 319, test circuitry 194 computes the phase of test compensation signal 34 in block 322. For example, with reference to the example equation for test compensation signal 34 provided above, test circuitry 194 may compute the phase as θ=a tan 2 (B, A).

In block 324, test circuitry 194 determines whether the computed phase differs by more than a predetermined amount from a threshold phase. In the example of FIG. 7, the threshold phase is based on a default phase selected in block 306. As noted above, the default phase corresponds to a default polarity for PZT actuator 140. If the polarity arrangement of PZT actuator 140 is assumed to be in a default configuration (e.g., default polarity 14), a default phase can be set for PZT actuator 140 based on an expected response to PZT test signal 32 when PZT actuator 140 is arranged with the default polarity.

However, if PZT actuator 140 is in fact arranged with the opposite polarity from the default polarity selected in block 306, the phase computed in block 322 should be approximately 180 degrees from the default phase, thereby indicating a polarity opposite the default polarity for PZT actuator 140. For example, if default polarity 14 for head 136 indicates a negative polarity for PZT element 170 and a positive polarity for PZT element 174, a computed phase of approximately 180 degrees from the default phase would indicate that the actual polarity arrangement for PZT actuator 140 includes a positive polarity for PZT element 170 and a negative polarity for PZT element 174.

Figure 8:
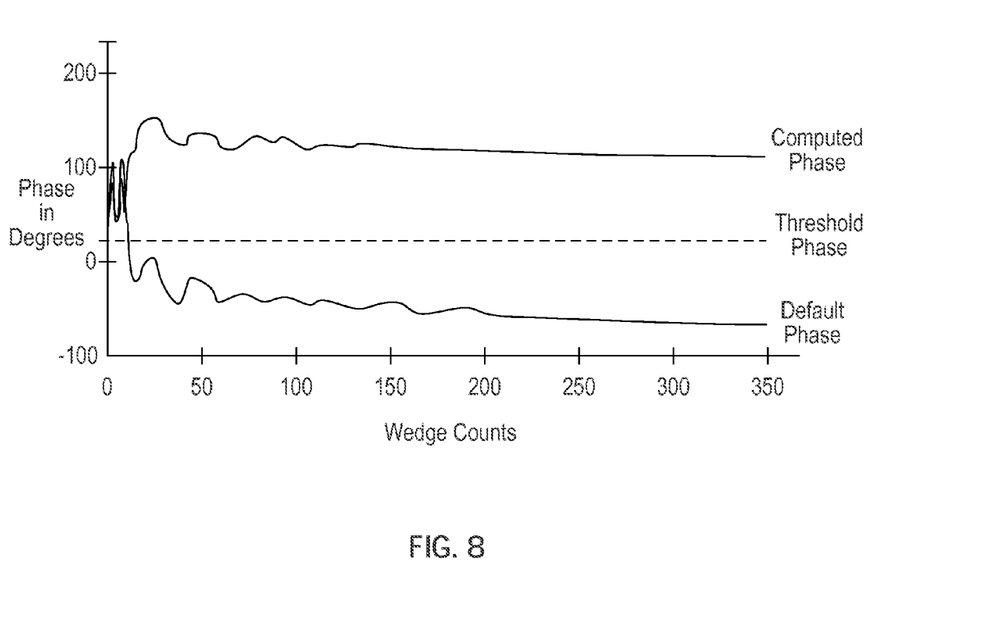
FIG. 8 depicts an example phase plot for a test compensation signal according to an embodiment.

FIG. 8 illustrates an example plot showing a default phase and a computed phase in response to injection of test signal 32 into PZT actuator 140. As shown in FIG. 8, the default phase converges at approximately −70 degrees while the computed phase converges at approximately 110 degrees. A threshold phase of 90 degrees plus the default phase is shown as a dashed line at approximately 20 degrees. Since the phase difference between the computed phase and the default phase is approximately 180 degrees, PZT actuator 140 would be considered to have the opposite polarity from the default polarity. In the example process of FIG. 7, test circuitry 194 would determine in block 324 that the computed phase differs by more than the predetermined amount from the threshold phase. In one embodiment, the predetermined amount could be zero if the threshold phase is 90 degrees from the default phase since this provides for robust detection of a 180 degree phase difference. Those of ordinary skill in the art will appreciate that other values for the default phase, predetermined amount, and threshold phase are possible.

Returning to FIG. 7, if test circuitry 194 determines in block 324 that the computed phase differs by more than the predetermined amount from the threshold phase, controller 122 in block 326 sets the polarity for PZT actuator 140 to the opposite polarity from the default polarity selected in block 306. On the other hand, if test circuitry 194 determines in block 324 that the computed phase does not differ by more than the predetermined amount from the threshold phase, controller 122 will use the default polarity selected in block 306 when controlling PZT actuator 140 during operation.

In block 328, controller 122 checks if permanently storing a polarity setting is allowed. More specifically, controller 122 may only be allowed to permanently store the polarity of PZT actuator 140 during a manufacturing process and not when disk drive 101 is in the field. If it is determined in block 328 that controller 122 is not allowed to permanently store the polarity of PZT actuator 140, controller 122 will temporarily operate with the polarity set in block 326 or alternatively with the default polarity. In such cases, controller 122 will again set the polarity for PZT actuator 140 when disk drive 101 restarts after shutting down.

If permanently storing the polarity is allowed in block 328, controller 122 in block 329 can, for example, permanently store the detected polarity in PZT polarity settings 12. Controller 122 can then control PZT actuator 140 during operation of disk drive 101 in accordance with the stored polarity for PZT actuator 140 in polarity settings 12.

In block 330, controller 122 checks whether the PZT actuators for all of the heads in disk drive 101 have been tested. If so, controller 122 reinitializes the PZT control loop by closing or conceptually closing switch 188 to allow for control of PZT actuator 140 by PZT actuator compensator 185. In addition, controller 122 disables test circuitry 194 by opening or conceptually opening switch 187. The process then ends in block 336.

If it is determined in block 330 that not all of the PZT actuators have been tested, the process proceeds to block 332 to change testing to a PZT actuator associated with a next head, such as by changing from testing PZT actuator 140 for head 136 to testing PZT actuator 192 for head 190. The process then returns to block 306 to select a default polarity for testing the next PZT actuator.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A disk drive comprising:
   a disk for storing data;
   an actuator arm;
   a head connected to the actuator arm for reading data from the disk and for writing data on the disk;
   a piezoelectric (PZT) actuator located between the actuator arm and the head for positioning the head over the disk; and
   a controller configured to:
      inject a test signal into the PZT actuator;
      receive a position signal indicating a position of the head over the disk resulting from the test signal;
      generate a test compensation signal based on the received position signal; and
      determine a polarity of the PZT actuator based on a phase of the generated test compensation signal.

2. The disk drive of claim 1, wherein the disk drive further comprises a non-volatile memory (NVM) for storing data, and wherein the controller is further configured to:
   store the determined polarity of the PZT actuator in the NVM; and
   control the PZT actuator during operation of the disk drive in accordance with the polarity stored in the NVM.

3. The disk drive of claim 1, wherein the controller is further configured to determine the polarity of the PZT actuator by comparing the phase of the generated test compensation signal with a threshold phase.

4. The disk drive of claim 3, wherein the controller is further configured to determine that the polarity of the PZT actuator is opposite from a default polarity if the phase of the generated test compensation signal differs by more than a predetermined amount from the threshold phase.

5. The disk drive of claim 4, wherein the threshold phase is approximately 90 degrees from a default phase corresponding to the default polarity.

6. The disk drive of claim 1, wherein the controller is configured to determine the polarity of the PZT actuator during a manufacturing process of the disk drive.

7. The disk drive of claim 1, wherein the controller is configured to determine the polarity of the PZT actuator each time the disk drive is powered-up.

8. The disk drive of claim 1, wherein the controller is configured to determine the polarity of the PZT actuator as part of a PZT actuator failure analysis.

9. A method for determining a polarity of a piezoelectric (PZT) actuator of a disk drive, wherein the disk drive includes a disk for storing data, and a head for reading data from the disk and for writing data on the disk, the method comprising:
   injecting a test signal into the PZT actuator;
   receiving a position signal indicating a position of the head over the disk resulting from the test signal;
   generating a test compensation signal based on the received position signal; and
   determining the polarity of the PZT actuator based on a phase of the generated test compensation signal.

10. The method of claim 9, wherein the disk drive includes a non-volatile memory (NVM) for storing data, and wherein the method further comprises:
    storing the determined polarity of the PZT actuator in the NVM; and
    controlling the PZT actuator during operation of the disk drive in accordance with the polarity stored in the NVM.

11. The method of claim 9, further comprising determining the polarity of the PZT actuator by comparing the phase of the generated test compensation signal with a threshold phase.

12. The method of claim 11, further comprising determining that the polarity of the PZT actuator is opposite from a default polarity if the phase of the generated test compensation signal differs by more than a predetermined amount from the threshold phase.

13. The method of claim 12, wherein the threshold phase is approximately 90 degrees from a default phase corresponding to the default polarity.

14. The method of claim 9, wherein the polarity of the PZT actuator is determined during a manufacturing process of the disk drive.

15. The method of claim 9, wherein the polarity of the PZT actuator is determined each time the disk drive is powered-up.

16. The method of claim 9, wherein the polarity of the PZT actuator is determined as part of a PZT actuator failure analysis.

17. A non-transitory computer-readable medium storing computer-executable instructions for determining a polarity of a piezoelectric (PZT) actuator of a disk drive, wherein the disk drive includes a disk for storing data, and a head for reading data from the disk and for writing data on the disk, and wherein when the computer-executable instructions are executed by a controller, the controller:

injects a test signal into the PZT actuator;

receives a position signal indicating a position of the head over the disk resulting from the test signal;

generates a test compensation signal based on the received position signal; and determines the polarity of the PZT actuator based on a phase of the generated test compensation signal.

18. The non-transitory computer-readable medium of claim 17, wherein the disk drive further includes a non-volatile memory (NVM) for storing data, and wherein when the computer-executable instructions are executed by the controller, the controller further:

stores the determined polarity of the PZT actuator in the NVM; and controls the PZT actuator during operation of the disk drive in accordance with the polarity stored in the NVM.

19. The non-transitory computer-readable medium of claim 17, wherein when the computer-executable instructions are executed by the controller, the controller determines the polarity of the PZT actuator by comparing the phase of the generated test compensation signal with a threshold phase.

20. The non-transitory computer-readable medium of claim 19, wherein when the computer-executable instructions are executed by the controller, the controller determines that the polarity of the PZT actuator is opposite from a default polarity if the phase of the generated test compensation signal differs by more than a predetermined amount from the threshold phase.

* * * * *